Oct. 5, 1926.
K. WARD
1,601,785
VEHICLE BUMPER
Filed Jan. 23, 1924
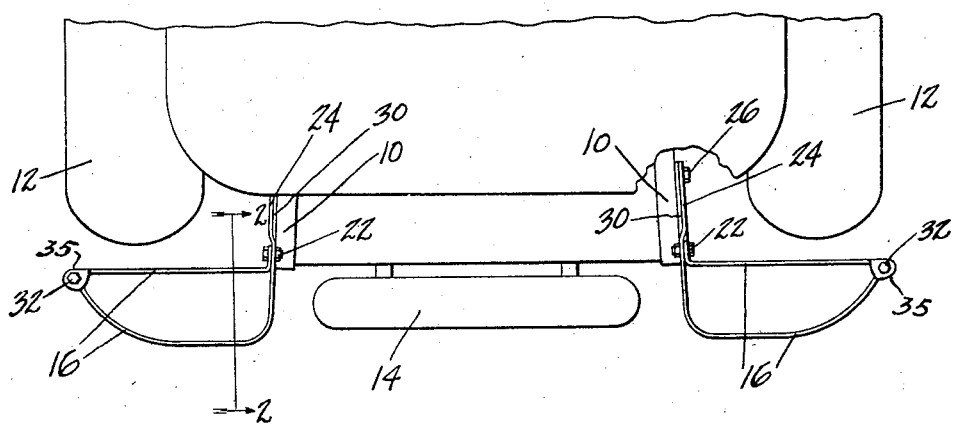
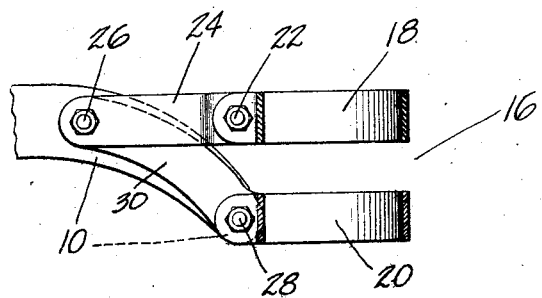
Inventor
Kenneth Ward
By his Attorneys Patented Oct. 5, 1926.

1,601,785

UNITED STATES PATENT OFFICE.

KENNETH WARD, OF JACKSON, MICHIGAN.

VEHICLE BUMPER.

Application filed January 23, 1924. Serial No. 688,022.

This invention relates to vehicle bumpers, and is illustrated as embodied in an automobile having wing bumpers protecting the rear fenders without substantially obstructing the space between the fenders.

An object of the invention is to provide a safe and efficient bumper of this character which is simple in construction and easily attached to an automobile frame. In one desirable arrangement, there are two vertically-spaced loops of material such as flat spring bars, extending outwardly at right angles from each side member of the chassis frame, and preferably connected at the outer ends of the loops by a novel spacing device. One feature of the invention relates to the attachment of these loops to the chassis frame.

The above and other objects and features of the invention, including various novel combinations of parts and desirable particular constructions, will be apparent from the following description of the embodiment shown in the accompanying drawings, in which Fig. 1 is a top plan view of part of an automobile equipped with wing bumpers at its rear end;

Fig. 2 is a section on the line 2—2 of Fig. 1, showing the manner of attaching one of the bumpers to the chassis frame; and Fig. 3 is a rear elevation of one of the bumpers.

In the arrangement selected for illustration, the invention is embodied in an automobile having a chassis frame including the side members 10, on which are supported the rear fenders 12. As shown in Fig. 2, each side frame member 10 may curve downwardly at its rear end in the usual manner. The frame may be provided with a carrier or support for a spare tire 14.

In order to provide protection for the fenders 12 without obstructing the center of the car or interfering with access to the spare tire, a wing bumper 16 is secured to each side frame member 10, extending outwardly therefrom behind the corresponding fender.

According to the present invention, each of the wing bumpers 16 comprises a pair of vertically-separated loops 18 and 20, each formed from a flat bar of spring steel stock. The two ends of loop 18 are bolted or riveted together at 22, the end which is parallel to the side frame member 10 being extended at 24 and attached to the side frame member, as, for example, by a bolt 26. The two ends of loop 20 are secured together at 28, and the end 30 parallel to side frame member 10 is curved upwardly to lie flat against the side frame member and be overlapped by end 24 and held by bolt 26. Preferably the fastening 28 is a bolt passing through the end of frame member 10. The outer ends of each pair of loops 18 and 20 are connected to preserve their relative vertical positions by a spacing device including a bolt having heads or nuts 32 engaging the top of the top loop and the bottom of the bottom loop, and a bushing or spacer 34 between the two loops. Suitable clips 35, formed with depending tabs 36, are provided to retain the said bolt in fixed position at the outer ends of the loops.

While one illustrative embodiment of my invention has been described in detail, it is not my intention to limit its scope to that embodiment, or otherwise than by the terms of the appended claims.

I claim:

1. A vehicle comprising, in combination, a chassis frame having side members, and a pair of wing bumpers carried by the frame, each bumper comprising a pair of vertically-spaced continuous spring loops extending outwardly at right angles from one of the side members.

2. A vehicle comprising, in combination, a chassis frame having side members, two vertically-separated spring loops mounted on each side of the frame and extending outwardly at right angles to the side members, and a spacing device between the outer ends of the loops on each side of the vehicle to preserve their relative vertical positions.

3. A vehicle comprising, in combination, a chassis frame including a side member, a pair of outwardly-extending vertically-separated loops formed of metal bars secured to said side member, and a spacing device between the outer ends of the loops preserving their relative vertical positions.

4. A vehicle comprising, in combination, a chassis frame including a side member curved downwardly at its rear end, and a bumper including a flat bar of metal bent to form a loop and provided with an angular curved arm adapted to overlap the end of the side frame member and to be secured thereto.

5. A vehicle comprising, in combination, a chassis frame having side members, a pair of vertically spaced spring bars attached to the side of said frame and extending rearwardly, said bars bent outwardly and having a return bend to form a loop extending outwardly from said frame.

6. A wing bumper in combination with a curved end portion of a vehicle frame comprising, in combination, a loop of spring bar steel formed with an angular up-turned supporting arm adapted to lie against the side of the said frame, a second loop vertically aligned and spaced from the first named loop and formed with a horizontal supporting arm having its end portion off-set to permit its overlapping with the said angular supporting arm.

7. A wing bumper comprising in combination with an inclined outward projecting portion of an automobile frame, a pair of vertically spaced aligned loops, supporting arms extending from the loops for attaching the said loops to the frame, the lower arm being bent upwardly to lie adjacent the said portion of the frame; the end of the upper arm being slightly offset to permit an overlapping thereof with the end of the lower arm.

8. A wing bumper comprising in combination with an inclined outward projecting portion of an automobile frame, a pair of vertically spaced aligned loops, supporting arms extending from the loops for attaching the said loops to the frame, the lower arm being bent upwardly to lie adjacent the said portion of the frame; the end of the upper arm being slightly offset to permit an overlapping thereof with the end of the lower arm, means to rigidly fix the said overlapping ends to the frame and means to tie together the outer overhanging ends of the loops including a bolt and clips formed with depending tabs.

9. A wing bumper comprising a pair of vertically spaced loops, supporting arms formed integrally with the said loops and arranged for attachment to a curved end portion of an automobile frame; the lower supporting arm being bent edgewise close to the other of the said supporting arms which is dished to provide an overlapping of the said arms; and means to maintain the said loops in parallel relation with respect to each other and in fixed relation with respect to the said frame.

In testimony whereof I affix my signature.

KENNETH WARD.